(12) United States Patent
Woolston et al.

(10) Patent No.: US 8,326,898 B2
(45) Date of Patent: Dec. 4, 2012

(54) METHOD AND SYSTEM FOR RUN TIME DIRECTORIES FOR ADDRESS SERVICES ON A MAIL PROCESSING SYSTEM

(75) Inventors: Mark Woolston, Copper Canyon, TX (US); Walter S. Conard, Lake Villa, IL (US); William A. Grady, Bedford, TX (US); Brian Bowers, Mundelein, IL (US); Richard Wojdyla, Wadsworth, IL (US); Gary Van Ermen, Palatine, IL (US)

(73) Assignee: Bell & Howell, LLC, Durham, NC (US)

( * ) Notice: Subject to any disclaimer, the term of this patent is extended or adjusted under 35 U.S.C. 154(b) by 310 days.

(21) Appl. No.: 12/466,007

(22) Filed: May 14, 2009

(65) Prior Publication Data
US 2009/0287742 A1 Nov. 19, 2009

Related U.S. Application Data

(60) Provisional application No. 61/053,402, filed on May 15, 2008.

(51) Int. Cl.
*G06F 12/00* (2006.01)
*G06F 17/30* (2006.01)
(52) U.S. Cl. ............... 707/828; 707/661; 705/60
(58) Field of Classification Search .......... 707/707, 707/752, 821, 661, 828
See application file for complete search history.

(56) References Cited

U.S. PATENT DOCUMENTS

| | | | | |
|---|---|---|---|---|
| 5,085,470 A | * | 2/1992 | Peach et al. .......... | 283/58 |
| 5,422,821 A | | 6/1995 | Allen et al. | |
| 5,703,783 A | * | 12/1997 | Allen et al. .......... | 700/213 |
| 5,734,568 A | * | 3/1998 | Borgendale et al. ... | 700/224 |
| 5,892,919 A | * | 4/1999 | Nielsen .............. | 709/228 |
| 5,930,796 A | * | 7/1999 | Pierce et al. ......... | 1/1 |
| 6,610,955 B2 | * | 8/2003 | Lopez ................ | 209/584 |
| 6,647,385 B2 | * | 11/2003 | Seestrom et al. ...... | 1/1 |
| 6,741,724 B1 | * | 5/2004 | Bruce et al. .......... | 382/101 |
| 6,865,561 B1 | * | 3/2005 | Allport et al. ........ | 705/406 |
| 7,397,009 B2 | * | 7/2008 | O'Donohue et al. .... | 209/584 |
| 7,413,114 B2 | * | 8/2008 | Miette et al. ......... | 235/375 |
| 7,769,765 B2 | * | 8/2010 | Stemmle ............. | 707/752 |
| 7,813,524 B2 | * | 10/2010 | Keller et al. ......... | 382/101 |
| 7,834,289 B2 | * | 11/2010 | Orbke et al. .......... | 209/584 |
| 7,840,414 B1 | * | 11/2010 | Parenti et al. ........ | 705/1.1 |
| 2002/0120668 A1 | * | 8/2002 | Pintsov et al. ........ | 709/200 |
| 2002/0176111 A1 | * | 11/2002 | Shaw et al. .......... | 358/1.18 |
| 2004/0093222 A1 | * | 5/2004 | Sipe et al. ........... | 705/1 |
| 2005/0187654 A1 | * | 8/2005 | Avant ................ | 700/215 |
| 2006/0112133 A1 | * | 5/2006 | Ljubicich et al. ...... | 707/102 |
| 2007/0057207 A1 | * | 3/2007 | Dean et al. .......... | 250/559.12 |
| 2007/0299792 A1 | * | 12/2007 | Pintsov et al. ........ | 705/402 |
| 2009/0055206 A1 | | 2/2009 | Orbke | |
| 2009/0057207 A1 | | 3/2009 | Orbke et al. | |
| 2009/0063551 A1 | * | 3/2009 | Shuster ............... | 707/102 |
| 2009/0157470 A1 | * | 6/2009 | Rathbun et al. ....... | 705/10 |

* cited by examiner

*Primary Examiner* — Wilson Lee
*Assistant Examiner* — Jessica N Le
(74) *Attorney, Agent, or Firm* — McDermott Will & Emery LLP

(57) ABSTRACT

The present application generally relates to address data maintenance services using a mail processing system. The present application discloses techniques and equipment to update address information and usage of mail processing equipment to print delivery point barcodes that represent the current and accurate address information available for the addressee. The present application also provides a new approach for storing and searching address and name run time directories as part of a mail processing system using address reader technology.

13 Claims, 7 Drawing Sheets

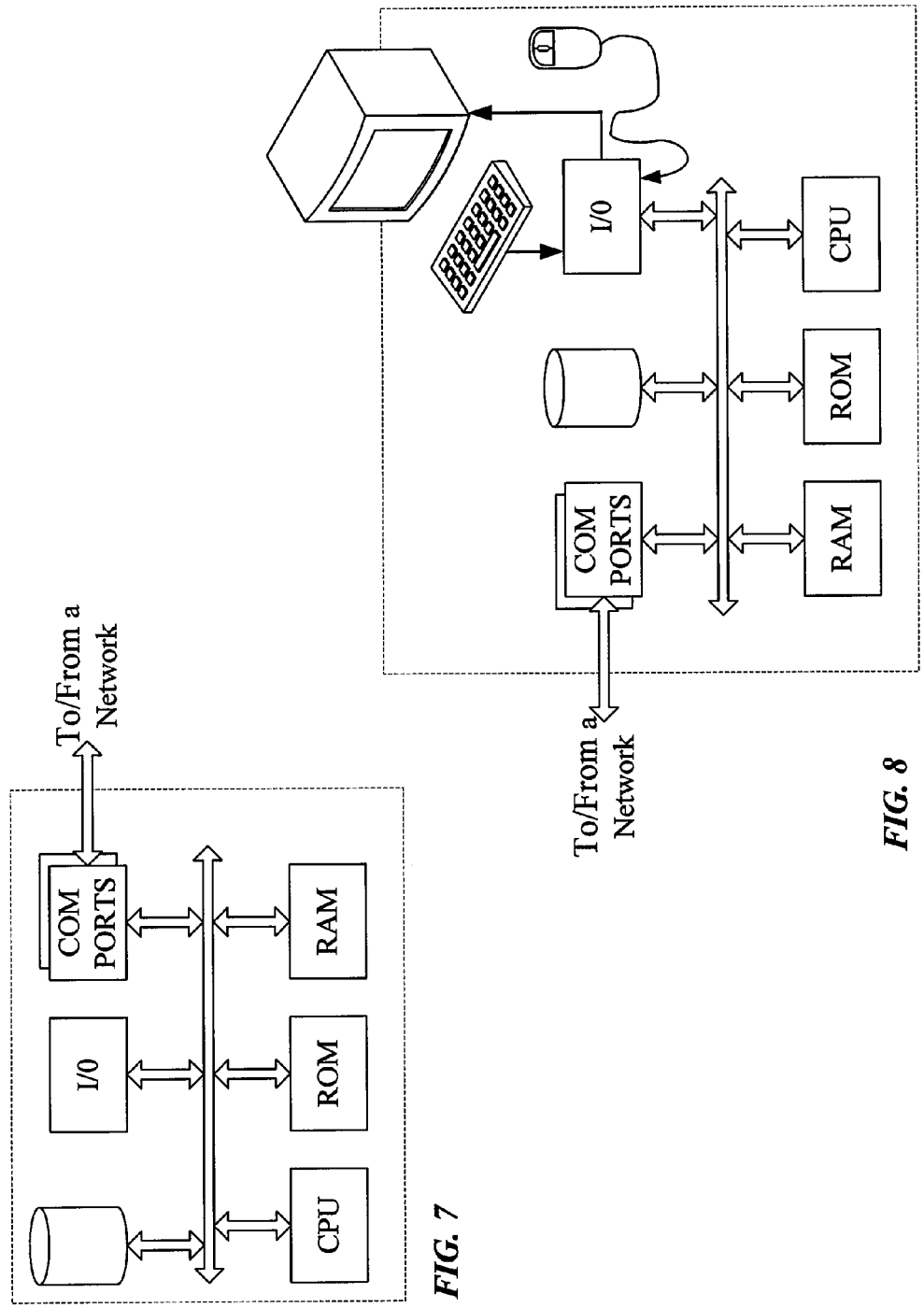

METHOD AND SYSTEM FOR RUN TIME DIRECTORIES FOR ADDRESS SERVICES ON A MAIL PROCESSING SYSTEM

RELATED APPLICATIONS

This application claims the benefit of U.S. Provisional Application No. 61/053,402, filed May 15, 2008 entitled "Method And System For Run Time Directories For Address Services On A Mail Processing System" the disclosure of which is entirely incorporated herein by reference.

TECHNICAL FIELD

The present subject matter relates to techniques and equipment to update address information and usage of mail processing equipment to print delivery point barcodes that represent the most current and accurate address available for the addressee.

BACKGROUND

Postal authorities are continuously seeking ways to improve address maintenance services for address quality so that move updates are reduced and so that less mail, which is processed by the postal authority, is undeliverable as addressed. Re-routing mail for delivery to a corrected address and updating address information costs the postal authority significant expense and reduces the standard of delivery for accuracy and time. Clients that use the mail for communication also want to reduce the same errors in addresses since they want fast delivery and want to minimize the number of pieces that are not deliverable causing a loss in the cost of the mailpiece and the postage. Currently the problems with the address information need to be corrected in the client's address list before the mailpiece is manufactured. This requires many complex processes using a variety of software address quality and address correction products. Often this means a major expense in Information Technology (IT) equipment and software changes plus operators to implement new processes within the IT department. The net result is that many clients do not make the changes needed to stay current with postal authority rules and the constantly changing address quality and move information.

Hence a need exists for accomplishing the address data maintenance services using a mail processing system, such as a sorter, a scanner, a copier or an inserter with an imaging system and printer. In order to perform address data maintenance services using a mail processing system, there exists a need for a new approach for storing and searching address run time directories as part of an address reader OCR system (AROS).

SUMMARY

It is desirable to provide a method for creating run time directories containing names and addresses for mail pieces. The method includes receiving name and address data associated with a customer, wherein the name and address data include a plurality of names and associated addresses. The name and address data are populated into an initial database and storing the initial database into a storage device. The initial database has a plurality of records, wherein each of the records includes a name and an address. It is determined whether the records satisfy a predetermined condition. A flag is provided to each record which satisfies the predetermined condition. A service data record is created and includes a plurality of records each having a name, an address and a flag. A name run time directory is created by extracting the name with the flag based on the flag, wherein the name run time directory has a name run time directory record including the name as data and the flag as flag data. An address run time directory is created by extracting the address with the flag based on the flag, wherein the address run time directory has an address run time directory record including the address as address data and the flag as flag data. The name runtime directory and the address runtime directory are outputted.

It is further desirable to provide a system for creating run time directories containing names and addresses for a plurality of mail pieces. The system includes a receiving unit for receiving name and address data. The name and address data includes a plurality of names and associated addresses associated with a customer. A storage device is provided for storing an initial database created by populating the name and address data. The initial database has a plurality of records, wherein each of the records includes a name and an address. One or more processors is configured to determine whether the records satisfy a predetermined condition, and give a flag to each record satisfying the predetermined condition. A service data record is created and includes a plurality of records each having the name, the address and the flag. A name run time directory is created by extracting the name with the flag based on the flag. The name run time directory has a name run time directory record including the name as data and the flag as flag data. An address run time directory is created by extracting the address with the flag based on the flag. The address run time directory has an address run time directory record including the address as address data and the flag as flag data. The name runtime directory and the address runtime directory are outputted.

It is yet further desirable to provide an address correction method for a plurality of mail pieces. The method includes reading an address from a first mail piece by an optical reading device. An address run time directory is accessed and the address run time directory includes a plurality of customers addresses and flags. The read address of the first mail piece is matched with an associated customer address. Based upon a predetermined condition of one or more of the flags, a barcode corresponding to an updated address is printed on the first mail piece. An address from a second mail piece is read by the optical reading device. The read address of the second mail piece is matched with a customer address. Based upon a predetermined condition of the flags, a barcode associated with the customer address is printed on the second mail piece.

Other concepts include providing for an address correction method for a plurality of mail pieces. The method includes reading a name from a first mail piece by an optical reading device. A run time name directory is accessed and includes a plurality of customer names and flags. The read name of the first mail piece is matched with an associated customer name. Based upon a predetermined condition of one or more of the flags, a barcode corresponding to an updated address is printed on the first mail piece. A name is read from a second mail piece by the optical reading device. The read name of the second mail piece is matched with an associated customer address. Based upon a predetermined condition of the flags, a barcode associated with the customer address is printed on the second mail piece.

It is further desirable to provide an address correction system for mail pieces. The system includes a receiving unit for receiving name and address data from either an electronic file provided by a customer or created from images of names and addresses printed on mail pieces and processed by a document processing system. An address storing unit is provided for storing an address run time directory and a name run time directory. The address run time directory includes correct addresses and flags. An address resolution system locates a correct address for a mail piece. A printing device prints corrected address information, relating to the corrected address on the mail piece.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 7 illustrates a network or host computer platform, as may typically be used to implement a server.

FIG. 8 depicts a computer with user interface elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Business entities that form a part of the address maintenance service which is performed on mail processing equipment are given numerous titles by those familiar with the postal service. For the purpose of this illustration, a client is the business entity that wishes to communicate with customers to achieve some business objective. The client usually maintains the integrity and accuracy of their customer address lists; although some clients may choose to contract for the address maintenance service. The client may be a department within a service provider's business such as, but not limited to, a financial institution or insurance company. As an example, the financial institution may perform all mail production operations within their operations and hence they are a service provider, but they may also have numerous clients such as different credit cards each with their own customer list. The service provider is the business entity, generally hired by the client to prepare the mail for delivery to the postal authority. The contracted services to be used on a document processing equipment or system may include, but are not limited to, document preparation, printing, inserting, metering and sorting. The client may choose to keep one or more of these functions in-house based on their business model, for security reasons, or for any other suitable reason. In addition, the service provider may be contracted for address list maintenance, or an address service provider may be used, which specializes in address processing.

Figure 1:
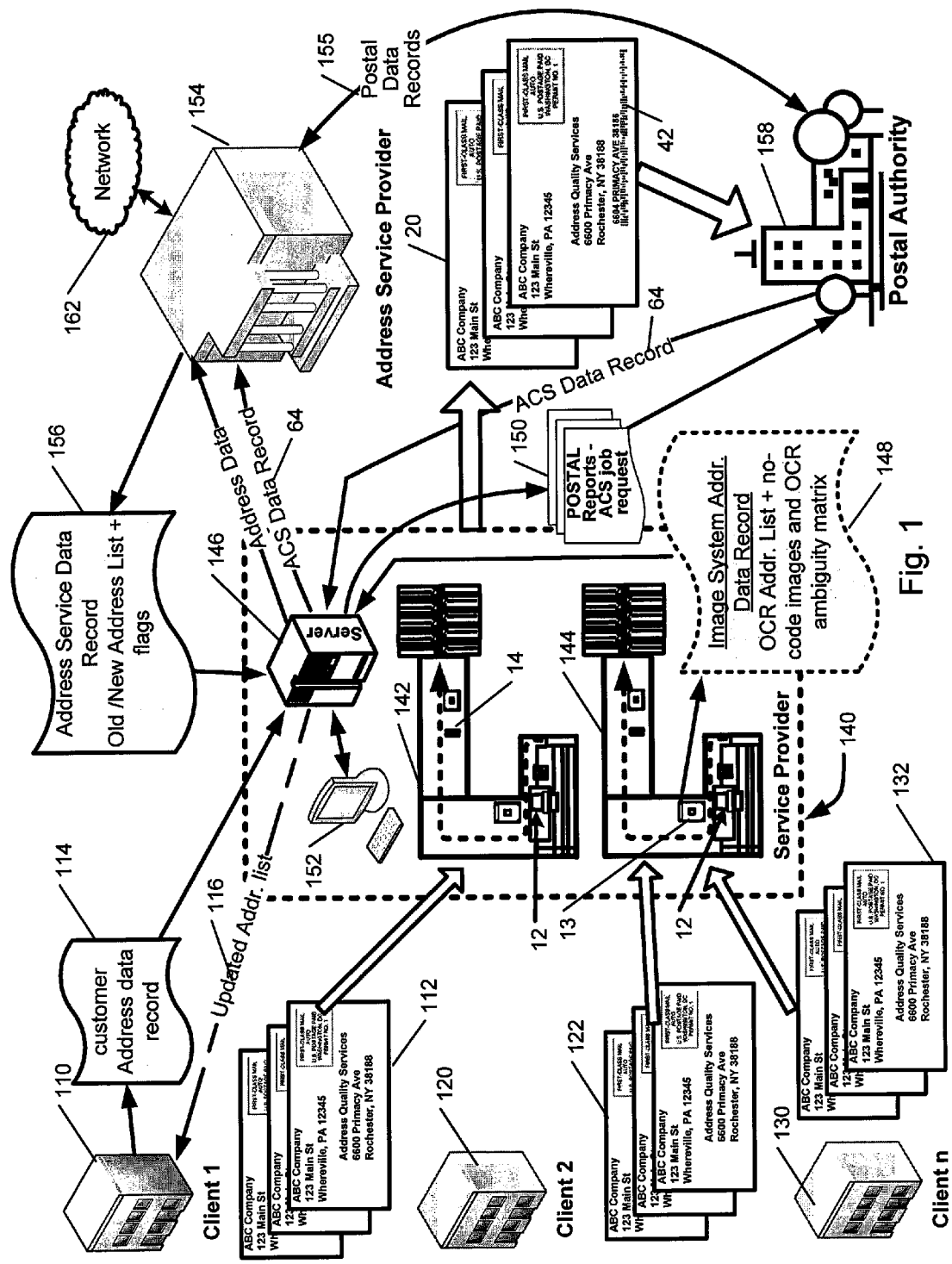
FIG. 1 is an illustration of the components that may be used to provide address services on mail processing equipment using sorters.

Reference now is made in detail to the examples illustrated in the accompanying drawings and discussed below. FIG. 1 illustrates exemplary components that may provide address services on mail processing equipment. An example of a system for address maintenance services on mail processing equipment is described in copending U.S. patent application Ser. No. 12/003,274 filed by Richard Wojdyla, entitled "Method And System To Provide Address Services With A Document Processing System" and filed on Dec. 21, 2007, which is incorporated herein by reference. An address reader OCR system 13 is a part of the system that is used to perform the address update process on a document processing system. Although numerous configurations of an address reader OCR system 13 can be used, the exemplary address reader OCR system 13 referenced herein contains an image capture device, an image processing system, Optical Character Recognition (OCR) technology, and a directory and lexicon lookup system to resolve OCR ambiguities and retrieve the delivery point data for a resolved address. The address reader OCR system 13 includes the computer hardware processing and associated software configuration for executing these functions. Those skilled in the art often refer to this process as reading the address on a mailpiece or document. As discussed more below, the imaging system may also be configured to obtain a postal authority approved address and an addressee name based on information captured from the mailpiece.

Four major entities are involved in the process to update address data on a mail processor in our example. Number one is the group of clients 1 through n (110, 120, 130) that have a communication requirement to customers. These clients have chosen the postal authority 158 to deliver the information to the customer in the form of mailpieces 112, 122, 132. The postal authority maybe a national postal service, a messenger service, private post or other entity that receives mail or mail like items for delivery. Some clients 110 have chosen to maintain their customer address list by using a service provider 140 to provide them with updated address list information 116. They could have purchased the needed software modules and software maintenance agreement (the databases used by address updating software change every month), however this approach requires IT changes and personnel to run the system. If this activity is not one of their core competencies, subcontracting this work is the preferred approach. Regardless of how the address list of customers is maintained, the list is used to create the address on each of the mailpieces either by showing the address through a window in the envelope or by printing the address on the envelope. As alluded to above, the quality and accuracy of the address list probably is defective unless a robust address maintenance system was used. Hence the clients typically have a critical requirement to make corrections to the address data on the envelope after the mailpiece has been created.

The number two entity is the service provider 140, who will correct the address deficiencies on the mailpieces. Although not shown in FIG. 1, the service provider may provide printing and inserting services in addition to the newly disclosed address maintenance process which uses mail sorters 142, 144 and data processing technology to correct address deficiencies on the mailpieces in this example. The service provider may have multiple sorters 142, 144 each allocated to perform different sorting operations. The service providers 140 will often allocate different sorters with different sort schemes based on the volume of mail to be processed and the expected groupings of destination delivery points needed to earn postage discounts. In FIG. 1, sorter 142 is dedicated to processing client mail for which an address data record 114 was received in advance of the physical mail 112. The client address data record 114 will be processed by the address service provider 154 for address maintenance services and the address service data record 156 will be returned before the mail is processed on sorter 142.

The address data is processed and updated by a service provider with resident software or by use of a remote address service provider 154. When the mailpieces are processed on the sorter or inserter, the printed address data is compared to the updated address data record to retrieve the updated address and apply the correct delivery point barcode. The address maintenance process is explained with FIG. 6. This enables the client to deliver mailpieces to the postal authority with corrected address data without having to perform these services using their IT department.

The second sorter 144 is dedicated to process client mail for which no client address data record 114 is available in advance. The exemplary address maintenance service involves two steps before addresses can be updated on the mailpieces 122, 132 during the sorting operation. The first step uses the sorter address reader OCR system 13, in combination with the sorter computers 12, to collect an image system address data record 148 that will be forwarded by the server/computer 146 to the address service provider 154 acts as a receiving unit for address maintenance processing. Special processing is required for the address extraction process to create address record 148. The image system address data record 148 is created for the client/customer mailing while the mail is being processed and sorted for the first time. The image system address data record 148 contains the results of each name and address that was read by the address reader OCR system 13 from the mailpiece image and validated against the national address directory. Addressee recognition may require the use of either and national name directory or a name directory customized for a given client.

In addition, the image system address data record 148 may contain an image of the mailpiece, if the address or name were not read. These images can be used with remote video encoding (RVE) at the address service provider 154 location. Computer terminal operators will key in the address and addressee data from the image and use computer assistance to identify the addressee and address. Alternately, an ambiguity matrix that is returned from the Optical Character Reader (OCR) for incomplete reads is included in the image system address data record 148 for those cases where the address service provider's processes can resolve the ambiguity using enhanced processes and lexicons. An ambiguity matrix occurs when the OCR can not distinguish characters such as 8 and B or C and G, etc. An alternative to the ambiguity matrix is for the OCR to return multiple potential results with confidence factors attached to each response. For example the actual name of "Mark Gordon" maybe returned from the OCR as "Nark Gordon" or "Mark Corden" or other combinations to be resolved by the address service provider 154. The address service provider 154 may use a national name directory, a name directory customized for a given client or a name and address service such as Experian® to resolve the name ambiguity.

Figure 2:
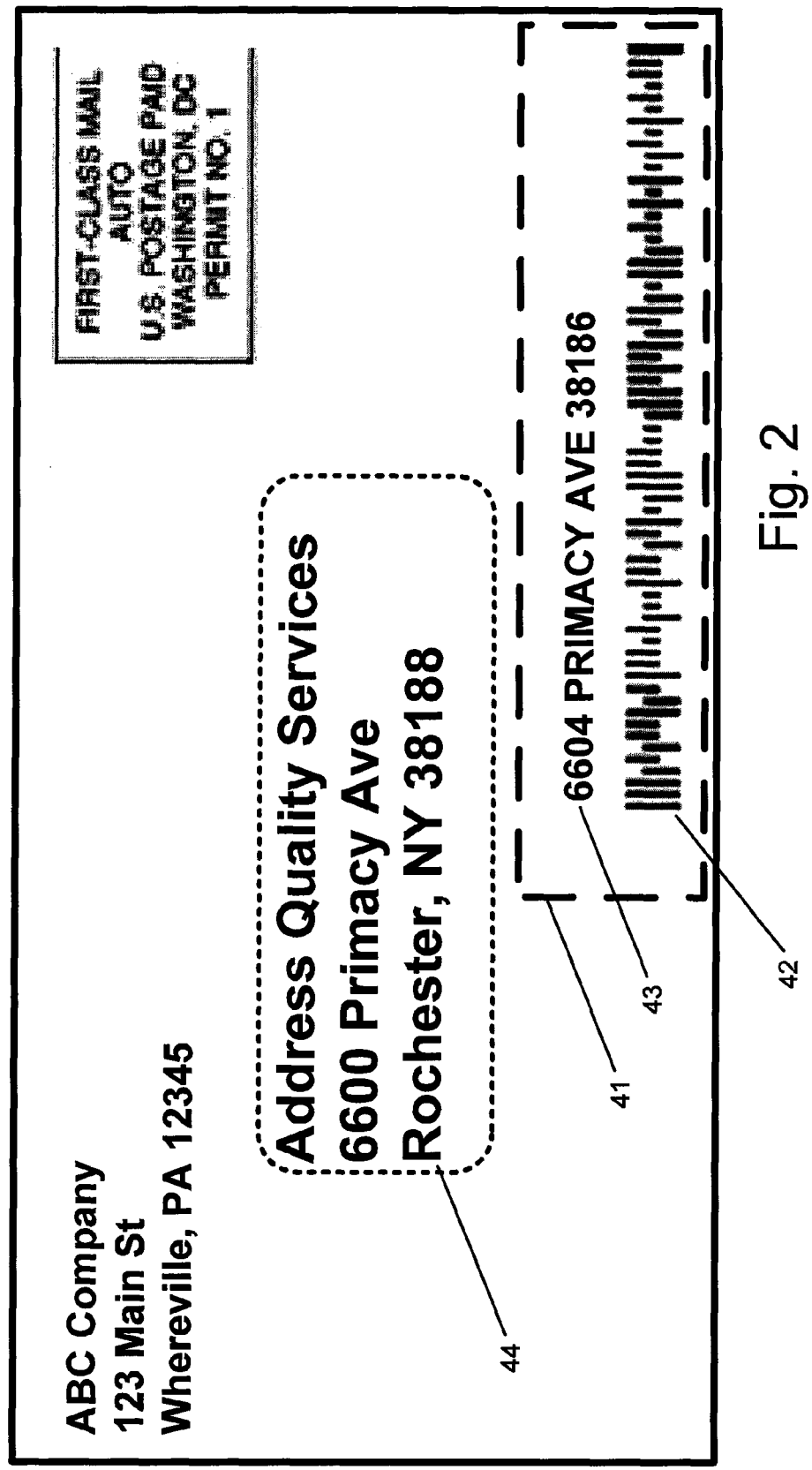
FIG. 2 is an illustration of a mailpiece following the application of address maintenance services.

The address service data record 156 is returned for use on sorter 144 the next time the client presents the same mailing (i.e. next month's credit card bill). In addition, the address service data record 156 may be used for a given client if a later mailing to the same customer address database 18 is generated and provided to the service provider 140. An example would be a credit card statement followed by an advertisement mailing or a privacy statement mailing. Those skilled in the art will identify additional mailings that are qualified to use the address service data record 156. The output of the service provider 140 function is mail 20 that has updated addresses based on the address maintenance service (450, FIG. 4) ACS job request 150, confirm request, mailer ID, a unique identifier or matchback code (as required) and has been pre-sorted based on postal authority rules. The necessary information has been encoded in the postal authority Intelligent Mail Barcode (IMB) 42 or in the delivery point barcode or other coded representation, Planet code, key line or endorsement lines as required by postal authority standards. Barcode is used as a generic term to represent any form of coded data that is printable on a mailpiece. The barcode maybe a GLIF, data matrix, snow flake UPC or other representation. Referring to FIG. 2, the barcodes 42 and/or updated address text 43 has been printed on the mailpiece, using printers 14 located on the sorter, before delivery to the postal authority by the mail processing equipment. The service provider 140 provides the necessary postal reports 150 either hard copy or electronically to the postal authority 158 to describe the mailing 20 that is submitted for delivery. An ACS job request and other communication maybe provided as part of the Postal reports 150.

The service provider 140 may have numerous computers to perform the various functions that are necessary. If multiple sorters are used, a server/computer 146 is used to manage data and provide an operator interface 152 to setup parameters associated with the clients and with sorter operations (sort schemes, mailing characteristics, etc.). The conversion of the address service data record 156 into run time directories (240, 242 FIG. 3) is performed in the server/computer 146 function as explained as part of FIG. 3. Each sorter has computers 12 associated with its operation. Numerous computers are frequently used to control run time operations, sorter management and image processing. The sorter operations may require running Address Change Service (ACS) to request that the postal authority provide move update data for all mailpieces where an addressee has moved and registered the move with the postal authority.

Figure 4:
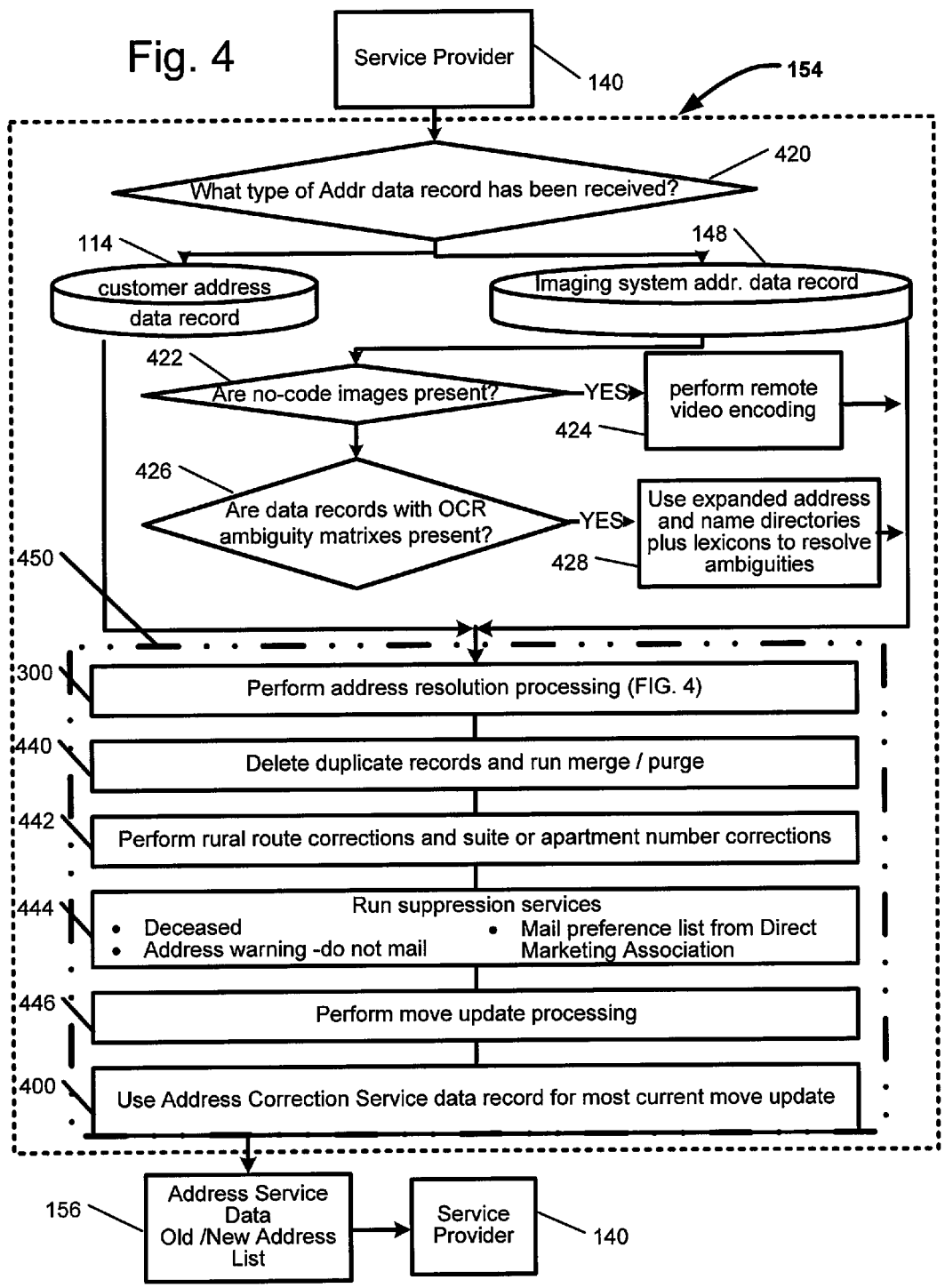
FIG. 4 is an exemplary flow chart depicting the functions performed the address service provider to update a client's customer address list.

The number three entity is the address service provider 154. The address service provider 154 is a separate operation and maybe connected to the service provider 140 with an internet connection or with a dedicated broadband connection. The address maintenance service functions that are necessary to improve address quality, enhance deliverability, update for moves and correct for changes in the address list content are all performed by the address service provider 154. The address service provider 154 receives client address data records 114 and image system address data records 148 from numerous clients which are routed through the service provider 140. The address service provider 154 receives data 155 from the postal authority 158. Data 155 is needed to keep the data directories current for moves, delivery points, suite numbers and national address data, to highlight a few of the data transfers. Other data needed for additional address maintenance services is received over the network 162 from phone directory sources, credit bureaus and geographic data providers. Additional sources of name and address data will be added as the address maintenance process evolves. Additional detail on the address service provider 154 process steps is depicted in FIG. 4. Having one centralized site for the address service provider 154 to provide service to numerous service providers 140 is the most efficient and cost effective solution. Advances in address maintenance services and the frequent data updates only need to be done once and with a dedicated team. However, most of the address service provider functions can be purchased as software products with subscriptions for the necessary databases. This would allow a service provider 140 to offer the address maintenance services without access to the address service provider 154.

The number four entity is the postal authority 158 such as the United States Postal Authority (USPS®). The postal authority 158 processes and delivers the mail 20 and provides many of the critical data records 155 needed to keep the address maintenance service current with the most recent address records, move data, and postal rules. Some of these data records include ACS data records 64 for individual clients as identified with the mailer ID. The ACS data records 64 contain move update data which was determined when an individual mailpiece was processed on postal sorting equipment when ACS has been selected for the mailpiece.

Figure 3:
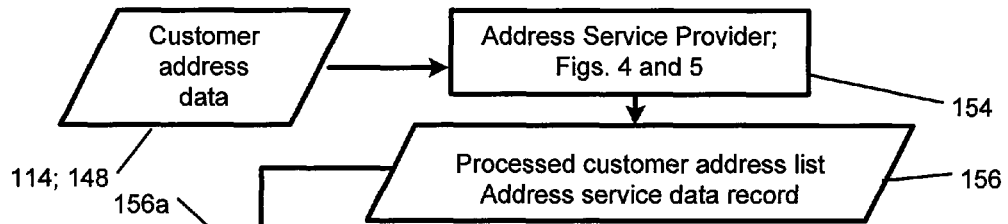
FIG. 3 is an illustration of the software based reader address directory structure for performing address services on mail processing equipment.

Referring now to FIG. 3, customer address data 114, 148 is provided by the client or is captured by the address reader OCR system 13, respectively, and transferred to the address service provider 154 for address maintenance services. For either scenario, receiving a client address data record 114 or creating an image system address data record 148 and transferring the file, the client may send additional data that is needed for complete address maintenance service. This data may include suppression data and suppression requirements plus a list of services that are authorized for the address service provider 154 to perform. The client address data record 114, in some cases, may contain only the added or deleted address records which will require sending this data and the previous client address data record to the address service provider 154 for address entry merge/purge processing.

The address service data record 156 is produced by the address maintenance service capability by the address service provider 154. Run time directories 240 and 242 are created from the address service data record 156 before the data can be used on a sorter. Before explaining how the run time directories, which are used by sorters 142 and 144 to validate and update customer addresses, are created, the functions of the address service provider 154 and the address resolution system 300 are explained with FIGS. 4 and 5 respectively.

Turning now to FIG. 4 for an exemplary flow chart of the functions preformed by the address service provider 154. The service provider 140 transfers all necessary files to the address service provider 154. These files include but are not limited to the client address data record 114, the imaging system data record 148, client configuration data that specifies address processing options to be executed, address list merge and purge data and the previously used address service data record 156 if not maintained by the address service provider 154. The processing steps are divided depending on the type of address data record that is received, step 420. For the case where a client address data record 114 is received, processing is transferred to the multiple processes that make up address maintenance services 450.

If an imaging system address data record is received 148, pre-processing steps maybe preformed to process images and OCR ambiguity matrices that are included in the imaging system address data record 148. When images are present 422, remote video encoding (RVE) 424 is performed to obtain the printed (old) address data and to obtain the addressee name. Computer terminal operators will key in the address and addressee data from the image and use computer assistance to identify the addressee and updated address. If the imaging system data record 148 contains OCR ambiguity matrices for incomplete reads, step 426, then the address service provider's processes resolve the ambiguity using enhanced processing that uses lexicons, address directories and name files that are not part of the national address directory, step 428. The output of steps 424 and 428 are additional addresses and addressees that can be added to the imaging system address data record 148. Other techniques can be employed by those skilled in the art which employ advanced fussy logic and artificial intelligence techniques to learn from previous encounters with the same or similar data. Once this is completed the processing is transferred to the address maintenance service 450 for processing.

The address service provider 154 has many tools and processes that can be used to address maintenance services 450. Additional services will evolve as postal authority regulations change and new processing technology becomes available. Alternate communications techniques also may be employed depending on the network connectivity and bandwidth available. The address maintenance service 450 process flow depicts 6 exemplary processes and explains the processing in a batch mode configuration, i.e. files in, files processed, files output. These same processes can be performed in real time on local server/computer 146 or in real time mode hosted from a remote site. The address maintenance service 450 starts by performing address resolution system 300 processing to obtain a postal authority certified address (ZIP+4 delivery code) and a delivery point (street number) that passes validation against the postal authorities list of approved numbers.

Figure 5:
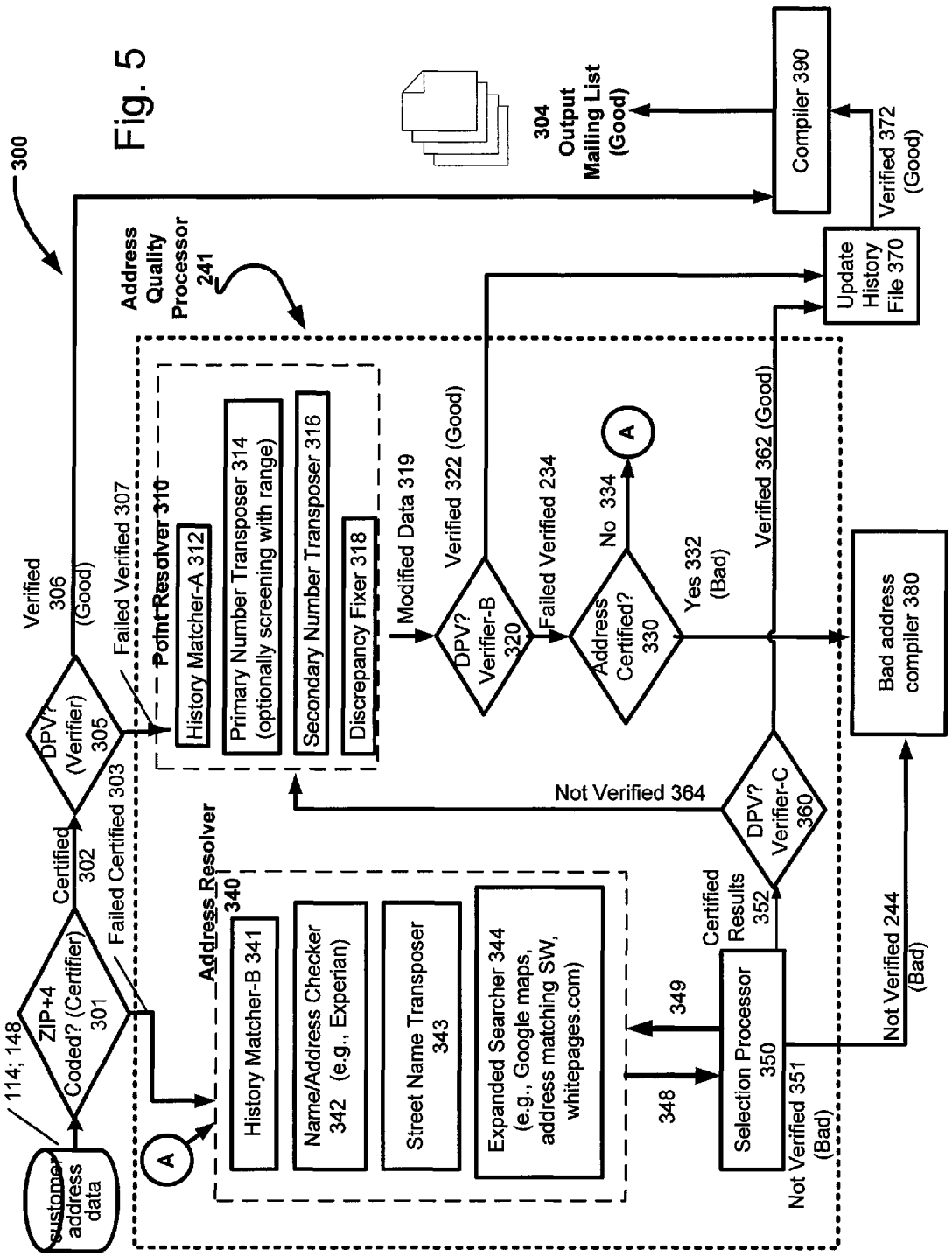
FIG. 5 is an exemplary flowchart depicting an address resolution system comprising an address resolver and a point resolver of an address resolution system.

Refer to FIG. 5 for full description of the details in this process. Step 440 deletes duplicate addresses and name records to prevent redundant mail from being processed and merges the new address data with the pre-existing address data to account for new customers. The client may provide a list of former customers to be purged from the address list. Step 442 is similar to the delivery point verification except this process validates and corrects for errors in suite and apartment numbers and converts rural route addresses into conventional street plus number addresses. The USPS refers to these processes as SuiteLink® and LacsLink® respectively. Suppression services 444 prevents the sending of mail to certain addressees based on criteria provided by the client or from alternate sources. Several common examples of suppression services are mailings to a deceased person, mailings to persons on the Direct Marketing Association (DMA) mail preference list or mailings to a prison, PO Box or college dormitory. Suppression service mail will generally be rejected from the mailing when encountered on a mail processing system. Move update processing is performed in step 446 to eliminate mailing of material to a former address for a given addressee.

Correction of addresses for moves is mandated by many postal authorities since the cost to forward mail is significant. The postal authority provides a data record of move data on a periodic basis, which is referred to as the national change of address (NCOA) file by USPS. This data is allowed to be greater than 90 days old hence many addresses may not be forwarded as required. Step 400 provides additional move update accuracy and currency by utilizing the address charge service (ACS). Mail that is processed by the postal authority is processed using various systems such as Postal Automated Redirection System (PARS) and the Computer Forwarding System (CFS) to correct address for move updates using data that is less than a week old. The address maintenance service 450 will use the ACS data record 64 for each client's mailer ID to further update the move data. The ACS data record will come to the address service provider 154 from the postal authority 158 either directly or routed through the client or service provider 140. The output from the address maintenance service 450 is the address service data record 156 as described in FIG. 4.

FIG. 5 is an exemplary flowchart depicting an address resolution system 300 comprising an address resolver and a point resolver which make up the address resolution system 300 An example of a system for resolving address quality issues that impede the effectiveness of mail piece delivery is described in copending U.S. patent application Ser. No. 11/892,581 filed by Wayne Orbke, entitled "Method And System For Performing Address Resolution Processing" and filed on Aug. 24, 2007, which is incorporated herein by reference. The process starts with client address data 114, 148 that is parsed and one address at a time is fed into ZIP+4 certifier 301 and a delivery point verifier (DPV) 305 if the certifier certified the ZIP+4 302. These two processes have two distinct output paths which flow into the address quality processor 240. The first path is Failed Certified 303, which input addresses that failed certification by Certifier 301. In contrast, Failed Verified 307 input addresses that were certified by Certifier 301, were transmitted to Verifier 305 via path Certified 302, and then failed verification by Verifier 305.

For example, the input address (Lewis Latimer, 3501 Devonshire, Germantown, Tenn. 38139) may contain the following address elements: name Lewis Latimer, primary address number 3501, street name Devonshire, city Germantown, state Tennessee, and 5 digit ZIP Code 38139. Two distinct error resolution paths may be pursued by processor 240 depending on which type of failure occurs.

Processor 240 comprises three major modules: a first module labeled Address Resolver 340, a second module labeled Point Resolver 310, and Selection Processor 350. Processor 240 also comprises minor modules: DPV Verifier-B 320, DPV Verifier-C 360, Address Certified 330.

The Address Certified Module 330 determines whether an address has previously passed through Address Resolver 340. The circled A at the bottom right indicates that path No 334 loops to the top of Address Resolver 340. If the address is certified 330 (yes 332) and has filed DPV, no additional processing is possible. This address is added to the list of bad addresses 380.

Update History File 370 uses a resolved (or corrected) address that has been verified and associates the verified address with the initial input address in a history file or database for use with History Matcher-A 312 and/or History Matcher-B 341. The history matcher modules may be a single module, or may be two distinct modules. If two distinct history matcher modules are used, it may be convenient to share a single history file database. Update History File 370 may be built into a History Matcher module, but it is convenient to show Update History File 370 outside of Processor 241 in order to indicate that processing by the Processor 241 is effectively finished.

Compiler 390 compiles verified input addresses from path Verified 306 and verified resolved addresses from path Verified 372. Compiler 390 outputs Output Mailing List 304 which will be integrated into the address service data record 156. The Compiler 390 may output an associated confidence level with each address. For example, resolved addresses from path Failed Certified 303 may have a different confidence level than from Failed Verified 307. Additionally, or alternatively, Address Resolver 340 or Selection Processor 350 or Point Resolver 310 may assign confidence values. Distinct confidence levels indicate the probability of successful delivery by the postal authority. Low confidence values may cause the address to be added to the bad address compiler 380 since postal financial penalties may apply for undeliverable as address mail. Additionally, third parties users may wish to send expensive color brochures to high confidence resolved addresses, in contrast to black and white brochures to low confidence resolved addresses. In other words, a confidence value associated with an address is valuable data which may be used or sold. This confidence factor is related to a probability that the addressee is likely of act on the advertisement enclosed in the mailpiece.

Address Resolver 340 may comprise multiple modules such as History Matcher-B 341, Name/Address Checker 342, Street Name Transposer 343, and Expanded Searcher 344. These multiple modules may be operated in series or on parallel. Address Resolver 340 receives Failed Certified 303, and outputs via path 348 to Selection Processor 350. Address Resolver 340 may also receive input 349 from Selection Processor 350 if a sufficient confidence value was not received from the process that obtained an address resolution 341, 342, 343 or 344. If a certified address can not be determined 351, this data is sent to the bad address compiler 380 where it is complied with addresses that failed 332 the address certifier 330. This list will be provide to the client or processed by the Address Service Provider (AS Provider) 154 to purge these addresses from the address list.

Point Resolver 310 may comprise multiple modules such as History Matcher-A, Primary Number Transposer 314, Secondary Number 318, and Discrepancy Fixer 318. Primary Number Transposer 314, Secondary Number 318, and Street Name Transposer 343 (from Address Resolver 340) may be portions of a single large Transposer module (not shown), or alternatively may share sub-modules (e.g. a sub-module for transposing digits of three digit numbers). Point Resolver 310 receives Failed Verified 307, and outputs Modified Data 319. Point Resolver also receives Not Verified 364 from Verifier-C 360. Addresses from the address resolver 340 that fail verifier-C 360 also must pass the point resolver 310 before they are verified as good 322.

Point Resolver 310 is configured to perform relatively quick and easy resolutions to Failed Verified 307, because input address in path Failed Verified 307 have already been certified by Certifier 301, and thus may be relatively high quality input addresses with relatively minor errors. Addresses that fail the verifier-B 320 but have not been through the address resolver 340 are transferred to that module via path A 334.

Returning to FIG. 3, address run time directories 240, 242 must be created for the address reader OCR system (AROS) 13 (FIG. 1) after the address service provider 154 has completed processing of the customer address data 114, 148, an address service data record 156 has been created. This record 156a contains the customer name 212, the original address 214 and the updated address 216 for each address that was updated plus data flags 218 to indicate any conditions associated with the customer address data 114, 148 processing. An exemplary data structure 156a is provided for the address service data record 156, shown in FIG. 3.

The first column is the date record index or record number 210. The record number 210 may be sequential or a pointer assigned to the data structure by a database system. The second column is the customer name 212 that was provided or read by the AROS when the mailpieces were first processed. As explained above, special processing through a name recognition service or video encoding may have been used to get the correct name for the mailpiece. The third column is the original customer address 214 that was in the customer address data 114 or read by the AROS to create the customer address data 148. The fourth column is the updated address 216 which is only populated if the address service provider 154 identified changes to the customer address 214 during the address maintenance processing. The fifth column contains the flags 218 that may be set to indicate conditions associated with the data entry. The flag definitions are included in the legend 220. These flags 220 are used as predetermined conditions that control how data records are processed. The list of flags is exemplary in nature, since those skilled in the art may identify alternatives based on their processing approach. The exemplary list of flags shown in the legend are used for numerous functions including but not limited to building the run time directories, operation of the address services on a mail processing system and building of a updated address list 116 to be provided to the client 110 or to be used by the service provider 140 to update the client's customer address record 114.

For this example of flags, it is assumed that flags 218 are set by the address service provider 154 since greater computer processing capabilities are available at this location. However, the service provider 140 or the server/computer 146 or computers 12 associated with the mail processing equipment maybe configured to perform the flag setting function. Flag M is set when a move address is detected for only one individual at the address being processed. Flag FM indicates that all individuals (e.g. an entire family) at the address have moved. Flag P is set if the updated address 216 is materially different from the original customer address 214. When P flag is set and the mailpiece that meets the criteria of a materially different new address is processed, an abbreviated version of the new address 43 (FIG. 2) is printed above the postal barcode 42 (FIG. 2). This is done so that the postal carrier can visually validate that this mailpiece should be delivered to the address (delivery point) encoded in the barcode versus the address printed in the address block 44 (FIG. 2) on the mailpiece. The definition of materially different address is defined by the postal authority based on instructions to the carrier. If a move has occurred the flag will generally be set; if the delivery point street address number is changed the flag maybe set and if the updated address is fixing an address defect such as an abbreviation (CA versus Calif) the flag is not set.

The DUPN flag is set when two or more identical names are contained in the address service data record 156*a*. The DUPN flag may be accompanied by a record number(s) that points to the record #210 where the duplication(s) exists. The DUPA flag identifies when there is a duplicate address in the address service data record 156*a* which is associated with different customer names. This is a rare condition that can be caused, for example, when the address is for a high rise apartment building and two or more customers failed to include the apartment number in their address. By postal standards, this condition would represent an undeliverable as addressed mailpiece. However, the address resolution process 300 (FIG. 5) is capable of correcting these errors using the address and customer name with the address resolver 340 (FIG. 5). Therefore, the mail processing equipment will be able to correct the addresses when the mailpiece is processed. The address maintenance service will not make a correction for a duplicate address in the customer address data and set the DUPA flag if the system determines that the address is complete as presented and the duplicate address represents multiple customers at the same valid address. The DUPA flag can be used as an aid in the alternate process which eliminates the need to read the name off the mailpiece and perform a name lookup in the name run time directory. This alternative approach is used when only a single name exists in the client addresses list for a given address. If the address maintenance process has corrected an address for reasons other than a move or duplicate address, the ARS flag is set. When the client has determined that a mailpiece should not be delivered after it has been produced, suppression services maybe used by setting the SUP flag. The client will have to provide a separate file to the address service provider 154 listing the name and address to be suppressed before the customer address data is processed.

The address service data record 156*a* is not in a form that is suitable for use as a directory by the address reader OCR system (AROS) which has to run at the processing speeds demanded by the mail processing equipment. Therefore, a conversion in to a lexicon based directory is required as indicated in step 221 (FIG. 3). Two run time directories are needed, the address run time directory 242 and the names run time directory 240. Both files are built at the same time and then converted into tiered lexicons that are used by the AROS to match the address and name read from the mailpiece with the data in the lexicon based directory. Lexicon based search engines are well know by those skilled in the art and are not explained in detail. The run time directory build process starts with record 1 of the record #, column 210, in address service data record 156*a*. This entry is a move, print abbreviated address and duplicate name (M; P; DUPN). The name 212 is copied to the run time directory names 240 along with the M flag 218. As mentioned earlier, if the address has only a single name associated with it, the name data does not have to be copied into the names run time directory 240. The customer address 214, updated address 216 and flags 218 are copied to the address run time directory 242 columns 226, 228 and 230 respectively.

In addition the ADDR 1 NEW address must be added to column 226 since this updated address may be present in future client mailings. For convenience this entry is shown (column 226, record 11) catenated following the final address (column 214, record 10) that was copied from column 214. The ADDR 1 NEW entry could be in any position in the address run time directory 242.

Records 2 and 5 of column 210 have no address update so the values of column 214 and 218 are transferred to columns 226 and 230 of the address run time directory 242 and no name data is required in the name run time directory 240.

Record 3 and 4 of the address service data record 156*a* are both address corrections that apply to all current and future residents of the address, as a result, no name data is required in the name run time directory 240. The customer address 214, updated address 216 and flags 218 for records 3 and 4 are copied to the address run time directory 242 columns 226, 228 and 230 respectively. In addition the ADDR 3 and 4 NEW must be added to column 226 since these updated addresses may be present in future client mailings.

Records 6 and 7 of the address service data record 156*a* are moves and will be processed in the same manner as record 1. The customer name for both records 6 and 7 are added to the name run time directory 240 even though record 6 is a family move. The addition of the record 6 name or names, if multiple family members are in other records, ensures that future resident's mail or residents with different surnames are not forwarded in error.

Records 8 and 9 represent defective addresses that have insufficient information to enable delivery. Since the address service provider 154 has resolved the problem and updated the address, the correct barcode 42 (FIG. 2) and human readable data 43 (FIG. 2) can be printed on the mailpiece. The address service data record 156*a* has associated the name C8 in column 212 with entry ADDR 8A NEW. This association must be maintained on the address run time directory 242 and name run time directory 240 when the data is transferred since the ADDR 8 provides no discrimination between the records 8 and 9. This correlation is accomplished by adding a record number in the flag column 224 of the name run time directory 240 that points to the corresponding record number 223 in the address run time directory 242. The process is the same whether the update is for the addition of missing data, flag ARS or a move, flag M. Both ADDR 8A and 8B NEW must be added to the address run time directory 242 column 226.

The last category is suppression services. There is no new address when the SUP flag is used. However, the mail processing equipment will reject this mailpiece, but only if both the name and address match in the name run time directory 240 and the address run time directory 242. In this case the name C10 (record 10, columns 212 and 218) are transferred to the name run time directory 240 and columns 214 and 218 are transferred to address run time directory 242 columns 226 and 230 respectively. The process defined above is repeated for all entries in the address service data record 156*a*. The data content defined in this exemplary structure is not intended to represent the actual format that data designer of ordinary skill would employ to obtain a searchable directory that has fast search speed and is highly compressed.

There are significant advantages to using the name run time directory 240 and address run time directory 242 in the AROS 13 (FIG. 1). Optical character recognition (OCR) systems have the highest accuracy read rate if the lexicon used for resolving OCR ambiguities is as short as possible. Since these directories are based on an individual customer address data, the size of the lexicon is significantly shorter than a list that is based on all the valid addresses in the country. Similarly, the name lexicon is much shorter than what is needed for the customer address data or for an entire country. The use of a separate name run time directory 240 which contains only the necessary names from the customer data and requires the reading of the name from a mailpiece only for a select group of flags (SUP; M; MF; DUPA), optimizes both the speed to the address reader OCR system and its accuracy. The directory generation process is completed by storing the name run time directory 240 and address run time directory 242 in the server/computer 146 or the mail processing equipment computer 12 until that particular client's mail is ready to run on the mail processing equipment, step 244. During operation of the mail processing equipment the run time directories are loaded into memory in the AROS 13 (FIG. 1).

Figure 6:
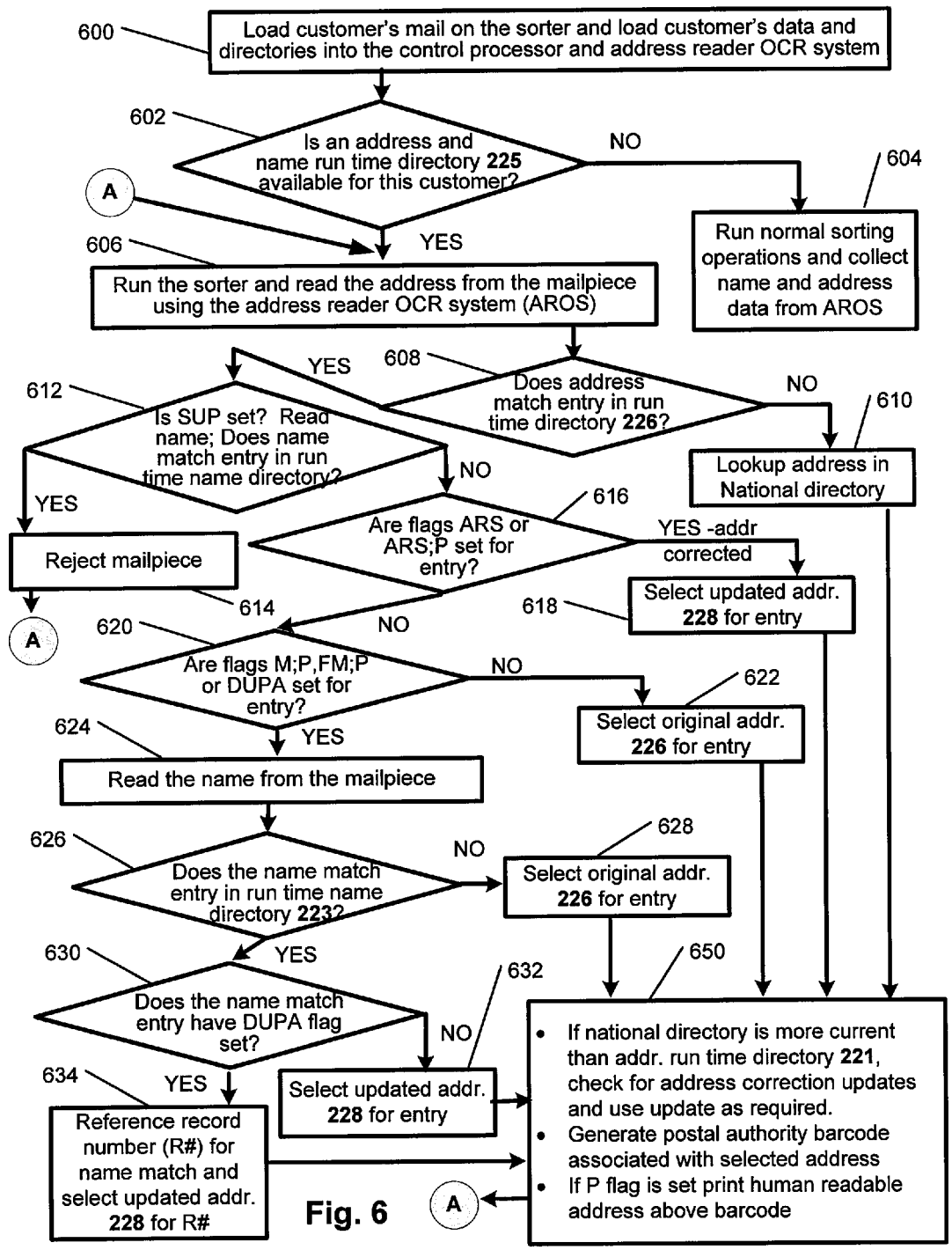
FIG. 6 is an exemplary flow chart depicting the functions performed on mail processing equipment to lookup address updates in a customer address directory.

Turning now to FIG. 6 to explain the run time operation of the mail processing equipment 142, 144 (FIG. 1) and the AROS 13 (FIG. 1). The process starts with step 600 with the loading of the client's mail onto the mail processing equipment, loading the client job control data into the mail processing equipment computer 12 and transferring the client's run time directories 240 and 242 into the AROS 13. If the run time directories 240 and 242 are not available, step 602, then operation will proceed with normal operations, step 604, using the national address directory and optionally collecting the image system address data record 148 as described above.

If the run time directories are available, the equipment operation begins with step 606 for each mailpiece. Steps 608 through 650 are repeated for each mailpiece as it is read by the address reader OCR system 13 until all of the client's mail has been processed. The logic of address processing against the client's run time directories commences with step 608 by matching the read address against the addresses in the address run time directory 242 column 226. If no match is found, this maybe a new customer not seen before. In this case, step 610 will be used to get an address match against the national directory. If the read address fails to match with the national directory, the mailpiece is rejected.

When an address match is found in the address run time directory 242, the next test is for suppression services, step 612. If the SUP flag is set, the name must be read from the mailpiece and compared to the names in the name run time directory 240 column 223. If a name match is found, the mailpiece in not to be mailed and is rejected, step 614. Processing is returned to step 606. If the SUP flag is not set, then the flags are checked for ARS and ARS; P, step 616. If the ARS flags are set, the ADDR x NEW is selected (from column 228) the associated delivery point (ZIP code) is used to create the postal barcode in step 650. In many cases the ADDR x NEW represents minor changes to the address that should be used by the client to update the customer address data but no action is required by the mail processing equipment. Only when the P flag is set will the mail processing equipment need to process the new address. Generally the P flag is an indication that the ZIP code has been updated by the address service provider 154. As mentioned earlier, the postal authority will determine under what conditions the human readable abbreviated address should be printed. For example if the change is only a one digit change in the street number, printing may not be required.

The next test, step 620, checks for moves and duplicate addresses (flags M; P; FM; P; DUPA). All three conditions will require the printing of the human readable abbreviated address. If none of these flags are set, the original customer address is correct (column 226) as presented, step 622, and control is transferred to step 650.

When the flags are set, the name data must be read from the mailpiece to ensure that the correct customer address is changed, step 624. As mentioned earlier, the OCR name read accuracy and speed is greatly enhanced since the comparison is only to names in the names run time directory 240, column 223 and not the entire customer name list or all names in a national listing. Since the run time directories 240, 242 are based on an individual client's address list, there exists an alternative approach where the name data for move updates are not required. If the client address list 114, 148 has a single name for a given address and the address service provider 154 address maintenance service 450 determined that a move occurred for that individual, the move address update can be used directly from the address run time directory 242, column 228. The step of reading the name from the mailpiece can safely be skipped since only one name for that address is in the client's address list. If no name match is obtained, step 626, the original address (column 266, step 628) is used to generate the postal authority barcode, step 650.

If a name match occurs, the DUPA flag must be checked, step 630. When the DUPA flag is not set, this represents a move for this customer and the updated address (column 228, step 623) is used to generate the postal authority barcode. In the case where the DUPA flag is set, step 634, multiple entries in column 226 have matched to the address read from the mailpiece. This creates an ambiguity as to which new address to use for generating the postal authority barcode (record 8 or 9 in column 226 for the example in FIG. 3). When the names run time directory 240 was created, the name was associated with the correct record number in column 226 for that name. The corresponding record number was stored in the flags column 224. Ambiguity as to which new address to use is resolved by referencing to the record as a pointer (R#8) to the corresponding new address entry in the address run time directory 242, column 228. This address is used to generate the postal authority barcode, step 650.

The last step 650 in this process involves checking the date that the run time directories were created versus the date of the most recent national directory which was released by the postal authority. Postal regulations require that all addresses on mailpieces, delivered to the postal authority for a postage discount (work share) have passed address quality standards including move update. All of the new addresses returned by the address maintenance service 450 have passed these standards (steps 301, 360, 305, 320 in FIG. 5 and steps 446 and 400 in FIG. 4). However, the client may not have submitted the customer address data in synchronism with the release of a new national directory and move update data, thereby resulting in an out of data certification of address quality by the address maintenance system. This is rectified by checking each address in the address run time directory 242 against the most recent postal authority standards. Once a certified address has been identified for the mailpiece being processed the delivery point data (11 digit ZIP code for the USPS) is provided to the barcode generator along with other required data so that the postal authority barcode can be created. The barcode is printed on the mailpiece in the postal clear zone 41 FIG. 2. If the P flag is set, the human readable abbreviated address 43 is printed above the barcode 42. Control is then returned to step 606 until all of the client mail has been processed.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is not the intent that FIG. 3 represent a complete data base design document specification or that FIGS. 4, 5 and 6 represent software coding documentation. Those skilled in that art will add additional steps needed to meet the requirements set forth herein.

Although the discussion above has focused largely on the methodologies, those skilled in the art will recognize that those methodologies may be embodied in specific equipment, systems or devices. Also, many of the operations described above may be carried out by processing and/or associated execution of software, firmware, or microcode operating on processors or computers of any type used to provide the functionalities of the servers, client devices and/or programmed control for the various manufacturing (mail processing) elements shown in the drawings. Additionally, code for implementing such operations may be in the form of computer instruction in any form (e.g. source code, object code, interpreted code, etc.) stored in or carried by any computer or machine readable medium.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that those skilled in the art are familiar with the structure, programming and general operation of such computer equipment and, as a result, the drawings should be self-explanatory.

As known in the data processing and communications arts, each such general-purpose computer typically comprises a central processor, an internal communication bus, various types of memory (RAM, ROM, EEPROM, cache memory, etc.), disk drives or other code and data storage systems, and one or more network interface cards or ports for communication purposes. The computer system also may be coupled to a display and one or more user input devices (not shown) such as alphanumeric and other keys of a keyboard, a mouse a trackball, etc., as represented generally by the operator interface 152 in the example of FIG. 1; or computers 12 in FIG. 1. The display and user input element(s) together form a service-related user interface, for interactive control of the operation of the computer system. These user interface elements may be locally coupled to the computer system, for example in a workstation configuration, or the user interface elements may be remote from the computer and communicate therewith via a network.

In the illustrated examples, servers such as 146 in FIG. 1 are intended to represent a general class of data processing device commonly used to run "server" programming. Such a device typically utilizes general purpose computer hardware to perform its respective server processing and to control the attendant communications via the network(s). Each such server, for example, includes a data communication interface for packet data communication. The server also includes a central processing unit (CPU), in the form of one or more processors, for executing program instructions. The server platform typically includes program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith.

Program aspects of the technology may be thought of as "products" typically in the form of executable code and/or associated data that is carried on or embodied in a type of machine readable medium. Media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, terms such as computer or machine "readable medium" refer to any medium that participates in providing instructions to a processor for execution. Such a medium may take many forms, including but not limited to, tangible storage media, as well as carrier wave and tangible transmission media. Non-volatile storage media include, for example, optical or magnetic disks, such as any of the storage devices in any computer(s) shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed:

1. An address correction method for a plurality of mail pieces processed on a mail processing system, the method comprising steps of:
    (a) receiving a customer mailing list containing name and address data from a customer via a network interface at a service provider, the name and address data including a plurality of names and associated addresses;
    (b) creating, by way of a processor, an address run time directory using the received name and address data associated with the customer, the address run time directory created in a format accessible by an optical reading device;
    (c) reading an address from a first mail piece by the optical reading device;
    (d) by way of the optical reading device, accessing at speeds compatible with mail processing speeds of the mail processing system, the address run time directory, the address run time directory including a plurality of customers addresses;
    (e) matching the read address of the first mail piece with an associated customer address;
    (f) based upon a predetermined condition, printing a delivery point barcode corresponding to an updated address on the first mail piece;
    (g) reading an address from a second mail piece by the optical reading device;
    (h) attempting to match the read address of the second mail piece with a customer address;
    (i) based upon a predetermined condition, printing a barcode associated with the customer address on the second mail piece when a match is found;
    (j) accessing a national directory when no match was found with respect to the second mail piece;
    (k) finding whether the read address is correct or not by using the national directory; and
    (l) printing a barcode for a correct address on the second mail piece based on the national directory finding.

2. The method of claim 1, wherein step (f) further comprises:
    determining whether a flag indicates suppression of the address;
    in response to the determination, outputting a signal indicating that the first mail piece is rejected.

3. The method of claim 1, wherein step (f) further includes:
    determining whether a flag indicates that an updated address for the address exists.

4. The method of claim 1, wherein step (f) further includes:
    determining whether a flag indicates a move with respect to the address.

5. An address correction method for a plurality of mail pieces processed on a mail processing system, the method comprising steps of:
    (a) receiving name data in a customer mailing list from a customer, via a network interface, at a service provider;
    (b) creating a run time name directory using the customer name data, the run time name directory created in a format accessible by an optical reading device;
    (c) reading a name from a first mail piece by the optical reading device;
    (d) by way of the optical reading device, accessing at speeds compatible with mail processing speeds of the mail processing system, the run time name directory, the run time name directory including a plurality of customer names;
    (e) matching the read name of the first mail piece with an associated customer name;
    (f) based upon a predetermined condition, printing a barcode corresponding to an updated address on the first mail piece;
    (g) reading a name from a second mail piece by the optical reading device;
    (h) matching the read name of the second mail piece with an associated customer address;
    (i) based upon a predetermined condition, printing a barcode associated with the customer address on the second mail pieceand
    (j) when a flag indicates that a human readable address is to be printed on the first mail piece, printing a human readable address corresponding to the barcode,
    wherein the mail processing system is selected from a mail sorter or inserter.

6. The address correction method according to claim 5, wherein the flag associated with the first mail piece indicates a duplicate address condition.

7. The address correction method according to claim 6, further comprising steps of:
    referencing a record to a corresponding new address entry in the address run time directory.

8. An address correction system for mail pieces processed on a document processing system, the system comprising:
    a receiving unit for receiving name and address data from either an electronic file provided by a customer or created from images of names and addresses printed on mail pieces and processed by a processor associated with the document processing system;
    an address memory storing unit for storing an address run time directory and a name run time directory, the address run time directory including correct addresses, the address and name run time directory stored in a format accessible by an optical reading device associated with an address resolution system that operates at run time speeds compatible with the document processing system;
    the address resolution system for locating a correct address for a mail piece, the address resolution system is configured to obtain a correct address from the address run time directory, compare the address obtained by the optical reading device with the correct address and in response to the comparison, instruct a printing device to print corrected address information relating to the address on the mail piece, wherein:

the printing device configured for printing corrected address information, relating to the corrected address on a postal authority clear zone on the mail piece, the address run time directory contains an address run time directory record including a correct address as address data, and the name run time directory contains a name run time directory record including a name as name data, the name corresponding to the correct address, wherein:

the address to be printed as the corrected address information is selected based on one or more flags, the address resolution system is further configured to determine whether the one or more flags indicates suppression of the address, and in response to the determination, output a signal to reject the mail piece.

9. The address correction system of claim 8, wherein the address resolution system is further configured to determine whether the flag indicates that an updated address for the address exists, and in response to the determination, obtain the updated address and instruct the printing device to print the corrected address information for the updated address on the mail piece.

10. The address correction system of claim 8, wherein the address resolution system is further configured to determine whether the flag indicates moving with respect to the address, and in response to the determination, instruct the printing device to print the corrected address information of the address on the mail piece.

11. The address correction system of claim 8, wherein the address resolution system is further configured to determine whether the flag indicates moving with respect to the address, in response to the determination, accessing the name run time directory for determining whether the name is included in the name run time directory, and in response to the determination, instructing the printing device to print the corrected address information for the address on the mail piece.

12. The address correction system of claim 8, wherein the address resolution system is further configured to determine whether the flag indicates moving with respect to the address, in response to the determination, accessing the name run time directory for determining whether the name is included in the name run time directory, and in response to the determination, obtaining an updated address for the name from the address run time directory, and instructing the printing device to print the corrected address information for the updated address on the mail piece.

13. The address correction system of claim 8, wherein, when the flag indicates that a human readable address is printed on the mail piece, the address resolution system is configured to instruct the printing device to print a human readable address corresponding to the corrected address information.

* * * * *